(12) United States Patent
Tang

(10) Patent No.: US 11,369,155 B2
(45) Date of Patent: Jun. 28, 2022

(54) REMOVABLE FACE MASK

(71) Applicant: MARKET UNION CO., LTD., Ningbo (CN)

(72) Inventor: Yihu Tang, Ningbo (CN)

( * ) Notice: Subject to any disclaimer, the term of this patent is extended or adjusted under 35 U.S.C. 154(b) by 192 days.

(21) Appl. No.: 16/938,409

(22) Filed: Jul. 24, 2020

(65) Prior Publication Data
US 2022/0022575 A1  Jan. 27, 2022

(51) Int. Cl.
*G02C 11/00* (2006.01)
*A41D 13/11* (2006.01)

(52) U.S. Cl.
CPC .......... *A41D 13/1184* (2013.01); *G02C 11/00* (2013.01)

(58) Field of Classification Search
CPC . A41D 13/1184; G02C 11/00; G02C 2200/04
See application file for complete search history.

(56) References Cited

U.S. PATENT DOCUMENTS

| | | | | |
|---|---|---|---|---|
| 1,193,340 A * | 8/1916 | Bader | ...................... | G02C 1/08 D16/320 |
| 1,962,818 A * | 6/1934 | Hoffman | ................ | G02C 11/00 2/12 |
| 2,342,982 A * | 2/1944 | Stern | ....................... | A61F 9/025 2/9 |
| 2,762,050 A * | 9/1956 | Bricker | .................... | G02C 7/16 2/13 |
| 2,858,539 A * | 11/1958 | Carlson | .................... | G02C 7/16 24/546 |
| 2,881,443 A * | 4/1959 | Barker, Jr. | .............. | A61F 9/025 2/9 |
| 3,204,252 A * | 9/1965 | Herrington, Sr. | ...... | G02C 11/12 2/13 |
| 3,505,679 A * | 4/1970 | Bennett | .................... | G02C 9/04 2/13 |
| 3,991,753 A * | 11/1976 | Viesca y Viesca | .. | A62B 18/082 351/158 |
| 4,298,991 A * | 11/1981 | Recenello | ................ | G02C 7/16 2/451 |
| 4,751,746 A * | 6/1988 | Rustin | ..................... | A61F 9/029 D16/330 |
| 4,764,990 A * | 8/1988 | Markert | .................... | A61F 9/02 128/201.15 |
| 4,825,878 A * | 5/1989 | Kuntz | .................... | A41D 13/11 2/9 |
| 4,937,880 A * | 7/1990 | Beard | ..................... | A61F 9/029 2/427 |
| 4,945,574 A * | 8/1990 | Dagher | .............. | A41D 13/1184 128/201.12 |
| 4,986,282 A * | 1/1991 | Stackhouse | ............... | A61F 9/02 128/857 |
| 4,989,274 A * | 2/1991 | Patelski, III | ............. | A61F 9/02 2/441 |

(Continued)

*Primary Examiner* — Robert H Muromoto, Jr.
(74) *Attorney, Agent, or Firm* — Rumit Ranjit Kanakia

(57) ABSTRACT

A removable face mask, which includes a face mask body and a supporting body, and further includes a fastener, wherein the fastener is rotated so that a buckling portion is passed through a hole on the face mask body and embedded into a hole on the supporting body, and the face mask body and the supporting body are connected in a snap-in manner, which simplifies the structure and provides the advantages of convenience in disassembly and use.

10 Claims, 2 Drawing Sheets

(56) References Cited

U.S. PATENT DOCUMENTS

| | | | | |
|---|---|---|---|---|
| 5,086,515 A * | 2/1992 | Giuliano | A61F 9/027 | 2/8.1 |
| 5,113,529 A * | 5/1992 | Carr | G02C 11/00 | 2/13 |
| 5,206,956 A * | 5/1993 | Olson | G02C 7/16 | 128/857 |
| 5,303,423 A * | 4/1994 | Gazzara | A61F 9/02 | 128/857 |
| 5,394,567 A * | 3/1995 | Vatterott | G02C 11/12 | 2/13 |
| D385,661 S * | 10/1997 | Moorhouse | D29/104 | |
| 5,718,002 A * | 2/1998 | Pavlak | A61F 9/029 | 2/13 |
| 5,793,463 A * | 8/1998 | Hirschman | G02C 11/12 | 351/44 |
| 5,983,390 A * | 11/1999 | Desy | A41D 13/1161 | 2/9 |
| 5,991,915 A * | 11/1999 | Moorhouse | A63B 71/10 | 2/9 |
| 6,237,147 B1 * | 5/2001 | Brockman | A61F 9/025 | 2/451 |
| 6,990,981 B2 * | 1/2006 | DuBois | A61F 9/045 | 2/9 |
| 7,055,521 B1 * | 6/2006 | Johnson | A62B 18/02 | 128/201.15 |
| D662,672 S * | 6/2012 | Carlborg | D29/122 | |
| 8,453,262 B2 * | 6/2013 | Green | A42B 3/225 | 2/9 |
| D730,584 S * | 5/2015 | Paulson | D29/110 | |
| 9,046,701 B2 * | 6/2015 | Nodtvedt | G02C 11/00 | |
| 9,201,251 B2 * | 12/2015 | Sadler | G02C 11/12 | |
| 9,848,667 B2 * | 12/2017 | Brace | A42B 3/225 | |
| 10,231,495 B2 * | 3/2019 | Nabai | A61B 90/30 | |
| 10,687,569 B1 * | 6/2020 | McDirmid | A42B 3/20 | |
| D899,002 S * | 10/2020 | Chapman | A41D 13/1184 | D29/110 |
| 10,945,470 B1 * | 3/2021 | Maroofian | A41D 13/1107 | |
| 10,973,267 B1 * | 4/2021 | Correa | G01K 13/20 | |
| 2012/0084904 A1 * | 4/2012 | Paulson | A42B 3/225 | 2/422 |
| 2015/0237931 A1 * | 8/2015 | Miller | A41D 13/1184 | 2/9 |
| 2021/0321691 A1 * | 10/2021 | Sprouse | A41D 13/1184 | |
| 2021/0345701 A1 * | 11/2021 | Mamatas | A41F 1/008 | |
| 2021/0368883 A1 * | 12/2021 | Stephens | B32B 7/08 | |

* cited by examiner

REMOVABLE FACE MASK

FIELD OF THE INVENTION

The invention relates to the technical field of daily necessities, and particularly to a removable face mask.

BACKGROUND OF THE INVENTION

Face masks generally function to shield light and provide protection to avoid direct contact with the face by light, wind, rain or other sundries. Conventional face masks on the market generally mainly have two major structures, i.e. a supporting body and a face mask body, wherein the face mask body is fixed by the supporting body. The face mask bodies on the market are mostly transparent and made of glass or plastic, and take the shape of a sheet or a thin plate. The conventional supporting bodies on the market are generally head-mounted ones, including head loops or helmets, wherein helmets are the most common riding tools which are sealed and hence not suitable for use in recreational activities such as riding bicycles or walking by family and friends. The simplified face masks commonly used in the market are generally headgear-type ones, wherein the head loop is fixedly connected to the face mask body, the head loop is sleeved on the head during use, the face mask body is in front of the human face, and hence prone to tightness and pain in the head, hairstyle changes, etc. if used for a long time, and the face mask body is inconvenient to replace for color or function replacement, resulting in inconvenience in use and requiring improvement.

SUMMARY OF THE INVENTION

In order to solve at least one of the above technical defects, the invention provides the following technical solutions.

A removable face mask comprises a face mask body and a supporting body, and further comprises a fastener which is rotatably connected to the supporting body and provided with a buckling portion at an end thereof, wherein an edge of the face mask is located between the support and the fastener, the support and the face mask body are provided with holes at the positions corresponding to the buckling portion, and the fastener is rotated so that the buckling portion is passed through the hole on the face mask body and embedded into the hole on the supporting body.

As an improvement of the face mask, the supporting body and the face mask body are connected in a snap-in manner, which simplifies the structure and provides the advantages of convenience in disassembly and use.

Further, the fastener is made of an elastic material, one end of the fastener is connected to the supporting body, and the buckling portion is radially arranged at the other end thereof, and the fastener does not need conventional connection structures such as pivot or hinge structures due to its rotational characteristic, which further simplifies the structure.

Further, the buckling portion is T-shaped and made of an elastic material, and has a longitudinal end connected to the fastener, and a transverse end embedded into the hole of the supporting body or protruding from the hole to limit the location by the transverse end, and the elastic material facilitates the buckling portion to pass through the hole on the face mask and pass through or be embedded into the hole on the supporting body, thereby providing convenience in use and good stability.

Further, the supporting body comprises a nosepiece and temples arranged at both ends of the nosepiece, the fastener is arranged on the nosepiece or the temples, the size of the face mask body matches the human face, one side of the nosepiece abuts against the face mask, the other side of the nosepiece abuts against the nose bridge of the human face upon wearing, and the temples are placed on the ears and cooperate with the nosepiece to support the face mask, so that the face mask has good stability, is convenient to use and wear, and is aesthetic.

Further, a ring body is arranged at an end of the fastener and sleeved on the temple, and the temple and the edge of the face mask are provided with holes at the positions corresponding to the buckling portion of the fastener, which simplifies the connection structure between the fastener and the ring body, thereby providing convenience in use.

Further, the nosepiece comprises a bar and a nose bracket that is connected to one side thereof, the nose bracket is located below the bar, and the bar abuts against the face mask body and the nose bracket is placed on the nose bridge upon wearing, thereby improving the stability of the face mask.

Further, the nose bracket and the bar are fixed at an included angle so that the nose bracket is inclined toward the face, thus avoiding contact between the face mask and the nose and improving comfort.

Further, the nose bracket is arc-shaped and integrally formed with the bar for the convenience of assembly.

Further, the bar is arc-shaped to suit the shape of the face mask.

Further, the face mask body is transparent, and arc-shaped as a whole, and two arc-shaped side edges are located between the fastener and the temples, so that the arc-shaped face mask is aesthetic and the face mask body easily butts the supporting body; and transparency facilitates observation and is suitable for wearing during riding so as to prevent wind, rain, etc. from blowing directly to the face and provide protection, but of course, other colors or films can also be coated on the transparent face mask to achieve the purposes of shielding light, changing color or preventing ultraviolet rays.

Compared with the prior art, the invention has the following beneficial effects:

1. the face mask has an improved connection structure between the face mask body and the supporting body, which is convenient for disassembly; and 2. the supporting body is structurally similar to an eyeglass frame, and the wearing structure of the face mask is changed, so that the face mask is convenient to use and aesthetic.

BRIEF DESCRIPTION OF THE DRAWINGS

In order to illustrate the technical solutions in the embodiments of the invention more clearly, the accompanying drawings necessary in the descriptions of the embodiments will be simply introduced below. Apparently, the accompanying drawings in the descriptions below only involve some embodiments of the invention, and one of ordinary skill in the art can also obtain other accompanying drawings without inventive work based on these accompanying drawings.

Figure 1:
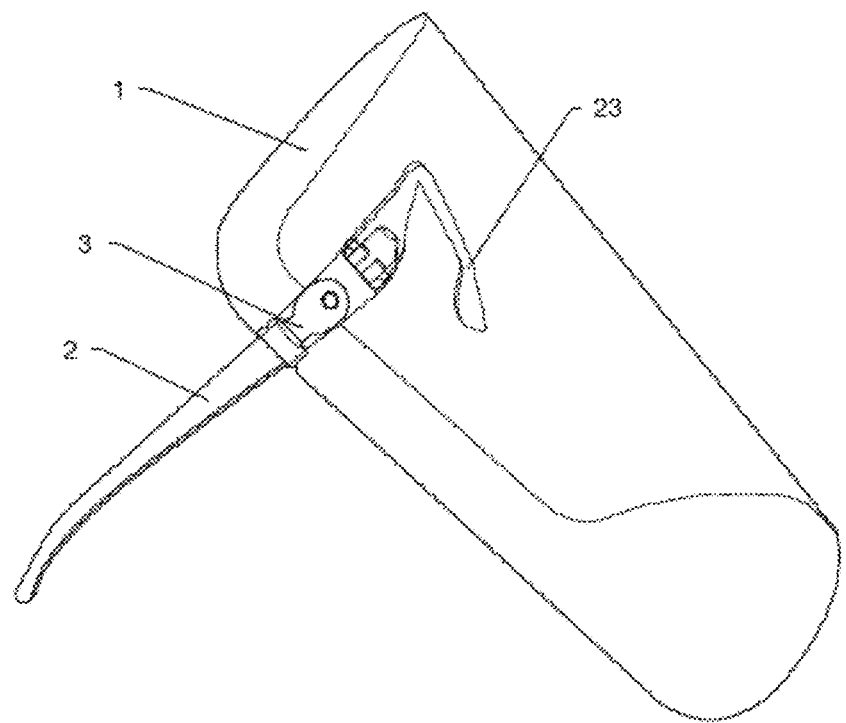
FIG. 1 is a side structural view of the invention.

REFERENCE NUMERALS 1. face mask body; 2. supporting body; 3. fastener; 21. temple; 22. bar; 23. nosepiece; 24. hole; 31. fastener body; 32. buckling portion; 33. ring body.

DETAILED DESCRIPTION OF THE INVENTION

The invention will be further described below with reference to the drawings and particular embodiments.

As shown in FIG. 1, the face mask comprises a face mask body 1 and a supporting body 2, wherein the face mask body can optionally have a structure that is fully transparent or has different colors or is adhered with anti-ultraviolet films and the like; and the face mask body is made of plastic, glass, etc., takes the shape of a sheet or a thin plate, and is arc-shaped and planar as a whole, and preferably, folded edges are formed on both side edges to facilitate butting.

Of course, the supporting body can also be a common head loop not shown in the drawings. The rotating connection structure between the fastener 3 and the supporting body 2 includes a conventional pivot or hinge connection structure. For example, hinging structures are common structures and therefore are not illustrated in the drawings.

Figure 2:
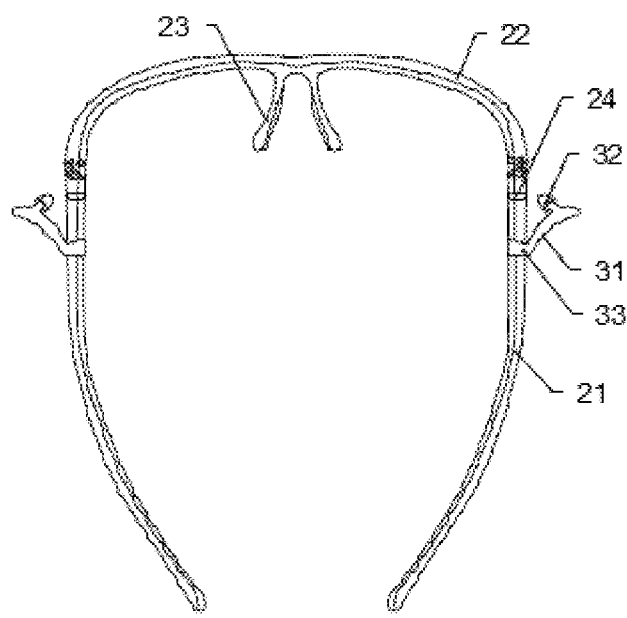
FIG. 2 is a top structural view of a supporting body.

The fastener is made of a plastic material, a metallic material or other materials. Of course, an elastic material is preferred, such as rubber. Referring to FIG. 2, the fastener body 31 is in the shape of a slat, a ring body 33 is formed at a tail end thereof to be directly sleeved on the supporting body, the fastener can be rotated by applying force under the action of the characteristics of the elastic material, a buckling portion 32 which is made of an elastic material and T-shaped (as shown) is formed at a front end of the fastener, and the supporting body is provided with a hole; when an edge of the face mask is located between the supporting body and the fastener, the buckling portion is directly pressed to pass through the hole on the face mask and then be embedded into the hole on the supporting body; preferably, a transverse end of the buckling portion continues to pass through the hole on the supporting body to limit the location by the transverse end; and the transverse end is preferably a cylinder or a sphere.

Of course, the buckling portion can also have a structure not shown in the drawings, such as a commonly used L-shaped structure, i.e. inverted L at an end thereof, which can also function to limit the location.

In addition, the fastener body can also take the shape of a triangle, a cylinder or the like not shown in the drawings.

Figure 4:
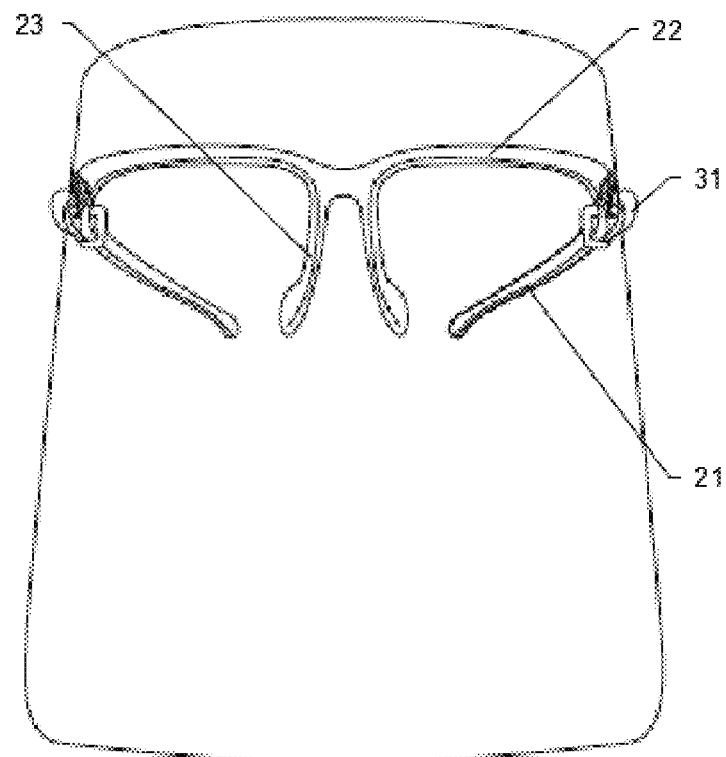
FIG. 4 is a rear view of the invention.

An eyeglass frame-type supporting body will be taken as an example for specific introduction. Referring to FIGS. 1 and 2, in this embodiment, the supporting body 2 comprises a nosepiece 23 and temples 21, wherein both ends of the nosepiece are rotatably connected to the temples. As shown in FIG. 4, the nosepiece is fixedly formed with a bar 22 and a nose bracket. In this embodiment, both ends of the bar are arc-shaped, the nose bracket is integrally formed on a bottom side of the middle of the bar, the nose bracket and the bar are fixed at an included angle (e.g. 30°) so that the nose bracket is inclined toward the face, and the nose bracket is arc-shaped and clamped on the nose bridge.

Figure 3:
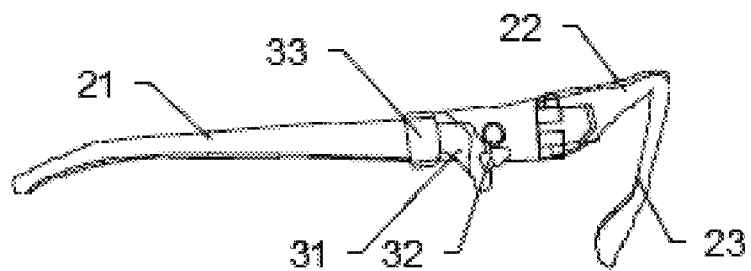
FIG. 3 is a side structural view of the supporting body.

Referring to FIGS. 2 and 3, in this embodiment, the fastener 3 is made of rubber, a ring body 33 is integrally formed at a tail end of the fastener body 31 and directly sleeved on the temple, a T-shaped buckling portion 32 is formed at a front end of the fastener body, the face mask body and the temple are provided with holes 24 at the positions corresponding to the buckling portion, and the face mask body 1 is arc-shaped with a narrow top and a wide bottom, which conforms to the facial structure of the human body.

Upon assembling, both side edges of the transparent face mask body 1 are placed between the temples 21 and the fastener body 31, then the bar 22 of the nosepiece abuts against the face mask body, and the fastener body is rotated so that the transverse end of the buckling portion passes through the hole on the face mask and the holes 24 on the temples to limit the location by the transverse end.

When in use, the eyeglass frame-type supporting body is directly worn on the face, the temples are hung on the ears, and the nose bracket is clamped on the nose bridge to provide support. Because of an included angle, there is a gap between the face mask and the nose on the face to avoid direct contact.

In addition, in another embodiment, the temples and the nosepiece can also be fixedly connected, e.g. directly integrally formed.

In addition, in another embodiment, the ring body of the fastener can also be sleeved at an end of the bar, and the ring body can be pushed forward from the temple and placed on the bar, the curvature of the bar and the face mask body can be correspondingly changed, and the bar can be provided with a hole.

The above description only involves preferred embodiments of the invention, the protection scope of the invention is not limited to the above embodiments, and all technical solutions under the idea of the invention fall within the protection scope of the invention. It should be noted that the ordinary persons skilled in the art can make several improvements and modifications without departing from the principle of the invention, and these improvements and modifications shall also be considered as the protection scope of the invention.

The invention claimed is:

1. A removable face mask comprising a face mask body and a supporting body, further comprising: a fastener which is rotatably connected to the supporting body and provided with a buckling portion at an end thereof, an edge of the face mask being located between the support and the fastener, the support and the face mask body being provided with holes at the positions corresponding to the buckling portion, and the fastener being rotated so that the buckling portion is passed through the hole on the face mask body and embedded into the hole on the supporting body.

2. The face mask according to claim 1, wherein the fastener is made of an elastic material, one end of the fastener is connected to the supporting body, and the buckling portion is radially arranged at the other end thereof.

3. The face mask according to claim 2, wherein the buckling portion is T-shaped and made of an elastic material, and has a longitudinal end connected to the fastener, and a transverse end embedded into the hole of the supporting body or protruding from the hole to limit the location by the transverse end.

4. The face mask according to claim 1, wherein the supporting body comprises a nosepiece and temples arranged at both ends of the nosepiece, the fastener is arranged on the nosepiece or the temples, the size of the face mask body matches the human face, one side of the nosepiece abuts against the face mask, and the other side of the nosepiece abuts against the nose bridge of the human face upon wearing.

5. The face mask according to claim 4, wherein a ring body is arranged at an end of the fastener and sleeved on the temple, and the temple and the edge of the face mask are provided with holes at the positions corresponding to the buckling portion of the fastener.

6. The face mask according to claim 4, wherein the nosepiece comprises a bar and a nose bracket that is connected to one side thereof, the nose bracket is located below the bar, and the bar abuts against the face mask body and the nose bracket is placed on the nose bridge upon wearing.

7. The face mask according to claim 6, wherein the nose bracket and the bar are fixed at an included angle so that the nose bracket is inclined toward the face.

8. The face mask according to claim 6, wherein the nose bracket is arc-shaped and integrally formed with the bar.

9. The face mask according to claim 6, wherein the bar is arc-shaped.

10. The face mask according to claim 4, wherein the face mask body is transparent, and arc-shaped as a whole, and two arc-shaped side edges are located between the fastener and the temples.

* * * * *